(12) United States Patent
Niu et al.

(10) Patent No.: US 12,333,994 B2
(45) Date of Patent: Jun. 17, 2025

(54) DISPLAY PANELS AND DISPLAY DEVICES

(71) Applicant: WUHAN CHINA STAR OPTOELECTRONICS TECHNOLOGY CO., LTD., Hubei (CN)

(72) Inventors: Xiaoyan Niu, Hubei (CN); Zhou Zhang, Hubei (CN)

(73) Assignee: WUHAN CHINA STAR OPTOELECTRONICS TECHNOLOGY CO., LTD., Hubei (CN)

(*) Notice: Subject to any disclaimer, the term of this patent is extended or adjusted under 35 U.S.C. 154(b) by 0 days.

(21) Appl. No.: 18/496,895

(22) Filed: Oct. 29, 2023

(65) Prior Publication Data

US 2025/0022401 A1 Jan. 16, 2025

(30) Foreign Application Priority Data

Jul. 11, 2023 (CN) .......................... 202310848127.8

(51) Int. Cl.
*G09G 3/20* (2006.01)
*G06F 3/041* (2006.01)

(52) U.S. Cl.
CPC ....... *G09G 3/2096* (2013.01); *G06F 3/04164* (2019.05); *G09G 3/20* (2013.01); *G09G 2300/0426* (2013.01); *G09G 2310/0243* (2013.01); *G09G 2330/021* (2013.01); *G09G 2354/00* (2013.01); *G09G 2360/144* (2013.01)

(58) Field of Classification Search
CPC ..... G06F 3/04164; G06F 3/0412; G09G 3/20; G09G 3/2096; G09G 2300/0426; G09G 2330/021; G09G 2354/00; G09G 2360/144; G09G 3/006; G09G 3/3208; G09G 3/3607; G09G 2300/0439; G09G 2310/0243; G09G 2330/012
See application file for complete search history.

(56) References Cited

U.S. PATENT DOCUMENTS

| | | | |
|---|---|---|---|
| 2006/0164408 A1* | 7/2006 | Nishikawa | G09G 3/3233 345/207 |
| 2009/0086137 A1* | 4/2009 | Horiguchi | G02F 1/13454 250/214 AL |
| 2013/0057512 A1* | 3/2013 | Lillie | G06F 3/0412 345/174 |
| 2015/0302831 A1* | 10/2015 | Reynolds | G06F 3/0412 345/174 |

(Continued)

*Primary Examiner* — Mihir K Rayan
(74) *Attorney, Agent, or Firm* — PV IP PC; Wei Te Chung

(57) ABSTRACT

Disclosed are a display panel, comprising: a pixel array disposed in the display area; a driving module disposed in the non-display area; a driving signal line, a first end of the driving signal line being connected to the driving module, and a second end of the driving signal line being connected to the pixel array; a detection module disposed in the non-display area; and a detection signal line, a first end of the detection signal line being connected to the driving module, and a second end of the detection signal line being connected to the detection module. An orthographic projection of the detection signal line in a thickness direction of the display panel has no overlap with an orthographic projection of the driving signal line in the thickness direction of the display panel; and a display device.

18 Claims, 6 Drawing Sheets

(56) References Cited

U.S. PATENT DOCUMENTS

2016/0189614 A1\* 6/2016 Tani ................. G09G 3/3233
 345/76
2021/0090509 A1\* 3/2021 Zheng ................. H03F 3/087

\* cited by examiner

DISPLAY PANELS AND DISPLAY DEVICES

CROSS-REFERENCE TO RELATED APPLICATIONS

The present disclosure claims the benefit of priority of Chinese Patent Application No. 202310848127.8 filed on Jul. 11, 2023, the contents of which are all incorporated herein by reference in their entirety.

TECHNICAL FIELD

The present disclosure relates to the field of display, and more particularly, to a display panel and a display device.

BACKGROUND

At present, a light sensor has been integrated into a display panel to achieve thinning. The integration of the light sensor into the panel requires an additional photosensitive driving chip for driving. However, the photosensitive driving chip is scarce and expensive in the market, which makes the cost of the display panel high.

SUMMARY

The present disclosure provides a display panel with a higher degree of functional integration while solving the problem of increased cost caused by the functional integration, and a display device.

In one aspect, an embodiment of the present disclosure provides a display panel having a display area and a non-display area disposed around the display area. The display panel includes a pixel array, a driving module, a driving signal line, a detection module, and a detection signal line. The pixel array is disposed in the display area. The driving module is provided in the non-display area, and is configured to output a driving signal to the pixel array. A first end of the driving signal line is connected to the driving module, and a second end of the driving signal line is connected to the pixel array. The detection module is provided in the non-display area, and is configured to output a detection signal to the driving module. A first end of the detection signal line is connected to the driving module, and a second end of the detection signal line is connected to the detection module. The detection signal line is provided on a side of the driving signal line away from the display area, an orthographic projection of the detection signal line in a thickness direction of the display panel has no overlap with an orthographic projection of the driving signal line in the thickness direction of the display panel, and the driving module is configured to provide the driving signal to the pixel array according to the detection signal.

In another aspect, an embodiment of the present disclosure provides a display device comprising a display panel, a flexible circuit board, and a printed circuit board. The flexible circuit board is electrically connected to the display panel and the printed circuit board, wherein the display panel has a display area and a non-display area disposed around the display area, and the display panel comprises: a pixel array disposed in the display area; a driving module disposed in the non-display area and configured to output a driving signal to the pixel array; a driving signal line, a first end of the driving signal line being connected to the driving module, and a second end of the driving signal line being connected to the pixel array; a detection module disposed in the non-display area and configured to output a detection signal to the driving module; and a detection signal line, a first end of the detection signal line being connected to the driving module, and a second end of the detection signal line being connected to the detection module. The detection signal line is disposed on a side of the driving signal line away from the display area, an orthographic projection of the detection signal line in a thickness direction of the display panel has no overlap with an orthographic projection of the driving signal line in the thickness direction of the display panel, and the driving module is configured to provide the driving signal to the pixel array according to the detection signal.

DETAILED DESCRIPTION OF THE EMBODIMENTS

Embodiments of the present disclosure will be described below in connection with the accompanying drawings of the present disclosure. The described embodiments are illustrated for the purpose of explanation and description of the idea of the present disclosure only, and should not be construed as limiting the scope of the present disclosure.

The various embodiments provided herein are similar, and technical features in different embodiments may be combined with each other.

Figure 1:
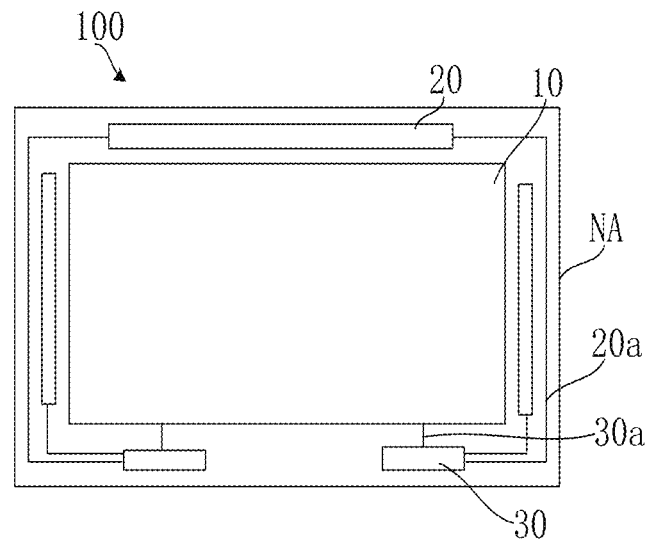
FIG. 1 is a schematic diagram of a first structure of a display panel according to some embodiments of the present disclosure.
Figure 2:
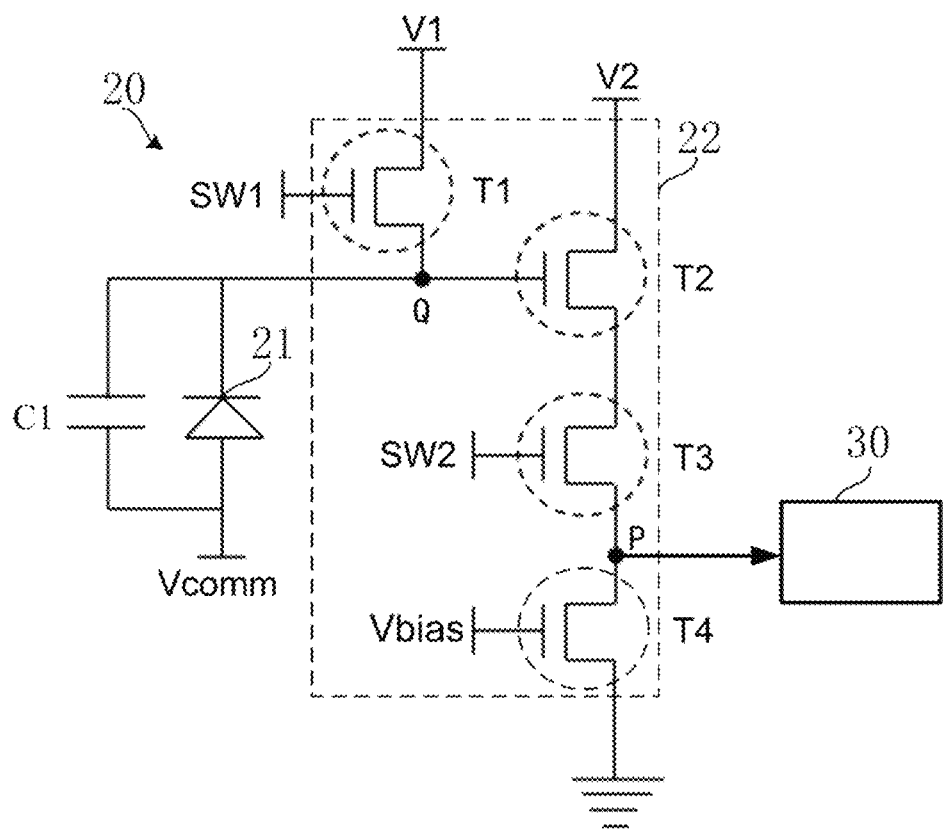
FIG. 2 is a circuit diagram of a first structure of a detection module of the display panel provided in FIG. 1.

As shown in FIGS. 1 and 2, an embodiment of the present disclosure provides a display panel 100 having a display area AA and a non-display area NA disposed around the display area AA. The display panel 100 includes a pixel array 10, a detection module 20, a driving module 30, a driving signal line 30a, and a detection signal line 20a. The pixel array 10 is provided in the display area AA.

The driving module 30 is provided in the non-display area NA, and is configured to output a driving signal to the pixel array 10. A first end of the driving signal line 30a is connected to the driving module 30, and a second end of the driving signal line 30a is connected to the pixel array 10. The detection module 20 is provided in the non-display area NA, and is configured to output a detection signal to the driving module 30. A first end of the detection signal line 20a is connected to the driving module 30, and a second end of the detection signal line 20a is connected to the detection module 20. The driving module 30 is configured to supply a driving signal to the pixel array 10 according to the detection signal.

The detection signal line 20a is provided on a side of the driving signal line 30a away from the display area AA, and an orthographic projection of the detection signal line 20a in a thickness direction of the display panel does not overlap an orthographic projection of the driving signal line 30a in the thickness direction of the display panel, so as to avoid signal interference caused by signal line crossing.

In some embodiments of the present disclosure, the detection module 20 includes a detection sensor 21 and a signal generation unit 22. The signal generation unit 22 is electrically connected to the driving module 30. The signal generation unit 22 includes a first node Q. The detection sensor 21 and the signal generation unit 22 are electrically connected to the first node Q. The detection sensor 21 is configured to acquire brightness information of an environment in which the display panel 100 is located, and to control an electric potential $V_Q$ of the first node Q according to the brightness information. The signal generation unit 22 is configured to generate the detection signal according to the electric potential $V_Q$ of the first node Q. Specifically, in an active matrix organic light emitting diode display, a corresponding driving signal is supplied to the pixel array 10 through the driving module 30 to control the screen brightness. In a liquid crystal display, a driving signal may be provided to the pixel array through the driving module 30 to control the screen brightness, and/or the brightness of the backlight may be adjusted to control the screen brightness. Moreover, the design of the detection sensor 21 may be changed to obtain other key parameters of light in the environment in which the display panel 100 is located, such as color temperature, ultraviolet index, and the like, thereby adjusting the display effect according to these parameters to better meet the requirements of use for human, or reminding consumers to pay attention to protection.

In the display panel 100 provided in the present disclosure, the driving module 30 is mounted on the display panel through a binding process or the like. The driving module 30 provides the driving signal to the detection module 20, receives and processes the detection signal output from the detection module 20, and feeds the detection signal (Ref/RO) back to a display control center. The display control center adjusts the driving signal supplied from the driving module 30 to the pixel array 10 according to the detection signal, or changes a backlight control signal or other signals in a display screen module, thereby achieving the purpose of adjusting the display effect of screens. As a result, the display panel can realize the optical signal detection function without an additional photosensitive driving chip, which is beneficial to reducing the cost while reducing the space occupied by the driving circuit. That is, the display panel provided in the present disclosure realizes higher function integration, and can solve the problem of the cost caused by function integration.

In some embodiments of the present disclosure, the display panel 100 includes a plurality of detection modules 20, which may be arranged at intervals on the same side of the non-display area NA in a width direction or a length direction of the display panel 100. The plurality of detection modules 20 may also be provided on both sides of the non-display area NA of the display panel 100.

In some embodiments of the present disclosure, the driving module 30 includes a gate driving module and a source driving module. At least one detection module 20 is provided on a side of the gate driving module away from the display area, and/or at least one detection module 20 and the source driving module are provided on opposite sides of the display panel, respectively. The first end of the detection signal line 20a is connected to the source driving module.

In some embodiments of the present disclosure, the display panel further includes a plurality of touch detection modules. Each of the touch detection modules includes a touch line 50 and a touch detection unit 51. The touch line 50 is electrically connected to the touch detection unit 51. The driving module 30 is electrically connected to the touch line 50, so as to drive the touch detection unit 51 and receive a touch detection signal. Meanwhile, the driving module 30 detects an optical signal within a preset period to output a first detection signal and a second detection signal, so that the display panel has a display function, a touch signal detection function, and an optical signal detection function.

In some embodiments of the present disclosure, the display panel includes a first level terminal Vcomm. The detection sensor 21 includes a photosensitive diode. An anode of the photosensitive diode is electrically connected to the first level terminal Vcomm, and a cathode of the photosensitive diode is electrically connected to the first node Q. The photosensitive diode converts the optical signal into a current or voltage signal. The detection signal output from the detection module 20 is received by the driving module 30 and processed into a digital detection signal, and finally a relationship between the digital detection signal and the optical signal can be obtained. Thus, key parameters of the optical signal, such as light intensity, color temperature ultraviolet intensity, and the like, can be derived by analyzing the digital detection signal. Depending on the obtained key parameters, a variety of optical signal detection functions can be realized and new applications can be developed. For example, the brightness of the display panel 100 can be automatically adjusted according to the light intensity, the cold and warm shades of the display panel 100 can be automatically adjusted according to the color temperature parameters, and functional displays for different application scenarios can be developed with different light signal parameters.

In some embodiments of the present disclosure, the detection module 20 further includes a capacitor C1. A first plate of the capacitor C1 is electrically connected to the anode of the photosensitive diode, and a second plate of the capacitor C1 is electrically connected to the cathode of the photosensitive diode. The photosensitive diode can detect light in the environment in which the display panel is located, and the capacitor C1 can achieve charge accumulation of photo-generated leakage currents from the photosensitive diode.

As shown in FIG. 2, the display panel 100 further includes a second level terminal SW1, a third level terminal V1, a fourth level terminal V2, a fifth level terminal SW2, and a sixth level terminal Vbias. The signal generation unit 22 includes a first transistor T1, a second transistor T2, a third transistor T3, and a fourth transistor T4. A gate of the first transistor T1 is electrically connected to the second level terminal SW1, a first electrode of the first transistor T1 is electrically connected to the third level terminal V1, and a second electrode of the first transistor T1 is electrically connected to the first node Q. A gate of the second transistor T2 is electrically connected to the first node Q, a first electrode of the second transistor T2 is electrically connected to the fourth level terminal V2, and a second electrode of the second transistor T2 and a first electrode of the third transistor T3 are electrically connected to the second node S. A gate of the third transistor T3 is electrically connected to the fifth level terminal SW2, and a second electrode of the third transistor T3 and a first electrode of the fourth transistor T4 are electrically connected to a third node P. A gate of the fourth transistor T4 is electrically connected to the sixth level terminal Vbias, and a second electrode of the fourth transistor T4 is electrically connected to the ground terminal. The driving module 30 is electrically connected to the third node P. The potential of the sixth level signal input from the sixth level terminal Vbias is a constant value.

Figure 3:
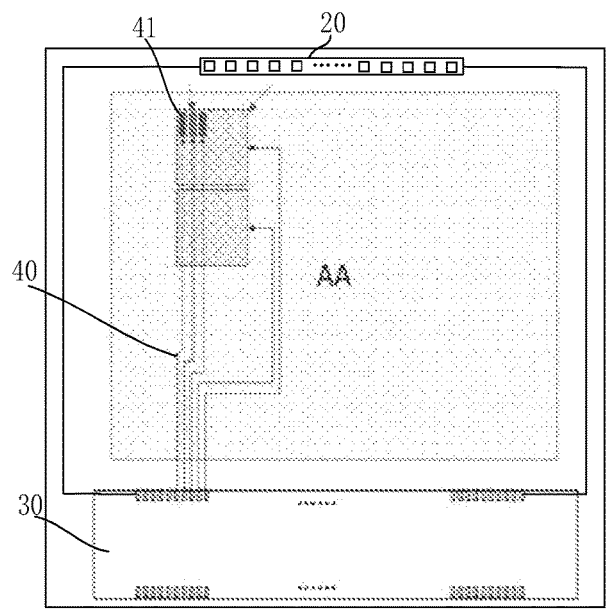
FIG. 3 is a schematic diagram of a second structure of a display panel according to some embodiments of the present disclosure.

As shown in FIG. 3, the display panel 100 includes a plurality of data lines 40. The driving module 30 is electrically connected to the signal generation unit and the plurality of data lines 40. Each of the data lines 40 is electrically connected to a plurality of sub-pixels 41. The display panel 100 further includes a plurality of touch signal lines 50. The driving module 30 is electrically connected to the signal generation unit and the plurality of touch signal lines 50.

Figure 4:
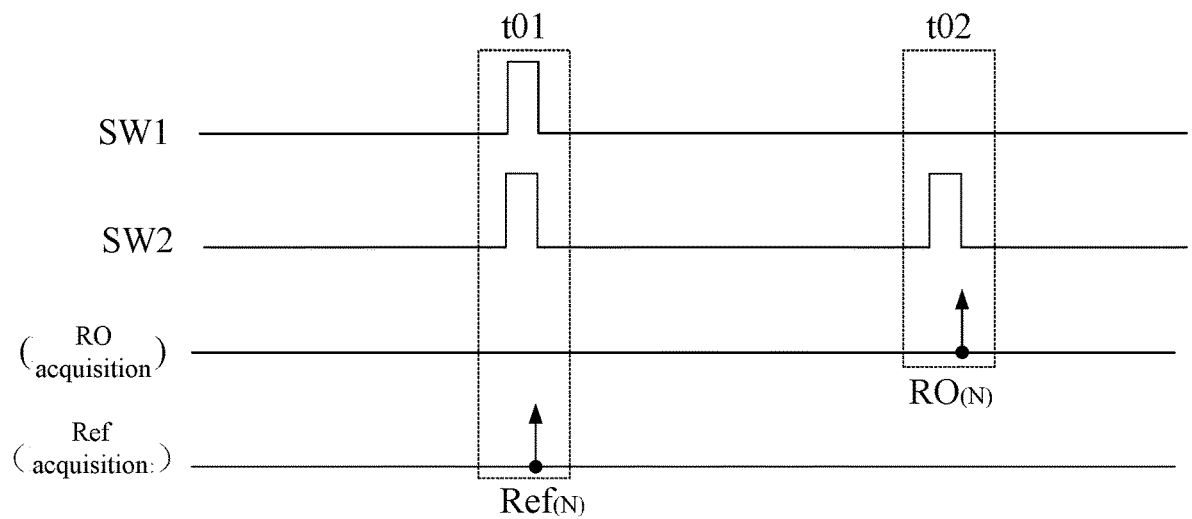
FIG. 4 is a first timing diagram of a detection period in a display panel according to some embodiments of the present disclosure.

As shown in FIG. 4, a detection period of the display panel 100 includes a first detection phase t01 and a second detection phase t02. The signal generation unit 22 is configured to output a first detection signal Ref at the first detection phase t01, and to output a second detection signal RO at the second detection phase t02. The driving module 30 provides the driving signal to the detection module 20, receives and processes the detection signal (Ref/RO) output from the detection module 20, and feeds the detection signal (Ref/RO) back to the display control center. The display control center adjusts the driving signal supplied from the driving module 30 to the pixel array 10 according to the detection signal, or changes the backlight control signal in the display screen module. Specifically, the driving module 30 acquires the first detection signal Ref and the second detection signal RO that are in the same detection period, with a time interval of a preset exposure time.

Specifically, in the first detection phase t01, both a second level signal input from the second level terminal SW1 and a fifth level signal input from the fifth level terminal SW2 are high level signals, and the first transistor T1 and the third transistor T3 are turned on. A third level signal supplied from the third level terminal V1 resets the potential $V_Q$ of the first node Q through the first transistor T1, so that the potential $V_Q$ of the first node Q gradually rises and tends to be stable, and the potential $V_Q$ of the first node Q is close to the potential of the third level signal. The second transistor T2 is turned on under the control of the potential $V_Q$ of the first node Q. A fourth level signal input from the fourth level terminal V2 is transmitted to the third node P through the second transistor T2 and the third transistor T3, and the potential of the third node P gradually rises and tends to be stable. The potential of the third node P is acquired after the potential of the third node P is stable and before the second level signal input from the second level terminal SW1 and the fifth level signal input from the fifth level terminal SW2 are converted from the high level to the low level. At this time, the potential of the third node P is the potential of the first detection signal Ref acquired by the driving module 30. Specifically, the driving module 30 may acquire the potential of the third node P at any time when the second level signal input from the second level terminal SW1 and the fifth level signal input from the fifth level terminal SW2 are both high levels, provided that the acquisition time is the same in each detection period.

In the second detection phase t02, the second level signal input from the second level terminal SW1 is a low level signal, and the first transistor T1 is turned off. The fifth level signal input from the fifth level terminal SW2 is a high level signal, and the third transistor T3 is turned on. The second transistor T2 is turned on under the control of the potential $V_Q$ of the first node Q. The degree of opening of the second transistor T2 is determined by the magnitude of the potential $V_Q$ of the first node Q, and the potential $V_Q$ of the first node Q is related to the brightness of the ambient light.

Specifically, when the ambient light is dark, the reverse current of the photosensitive diode is low, that is, the potential $V_Q$ of the first node Q is close to the potential of the second level signal supplied from the second level terminal SW1. When the ambient light is bright, the reverse current of the photosensitive diode is large, and the potential $V_Q$ of the first node Q is close to the potential of the first level signal supplied from the first level terminal Vcomm. The degree of opening of the second transistor T2 decreases under the control of the potential $V_Q$ of the first node Q, so that the current in a path between the fourth level terminal V2 and the ground terminal decreases, and the potential of the third node P decreases. The driving module 30 acquires the potential of the third node P when the second level signal input from the second level terminal SW1 is converted from the low level to the high level. At this time, the potential of the third node P is the potential of the second detection signal RO acquired by the driving module 30. Specifically, the driving module 30 may acquire the potential of the third node P at any time when the fifth level signal input from the fifth level terminal SW2 is a high level, provided that the acquisition time in each detection period may be the same.

By comparing the potential of the third node P acquired in the second detection phase t02 with that acquired in the first detection phase t01, the brightness change of light in the environment in which the display panel 100 is located can be determined from the potential difference value. As a result, the driving signal supplied to the pixel array 10 can be adjusted according to the brightness of light in the environment in which the display panel 100 is located. Further, a relationship between the potential of the third node P and the brightness of the ambient light may be established, so that the brightness of light in the environment in which the display panel 100 is located may be determined based on the potential of the third node P.

Figure 5:
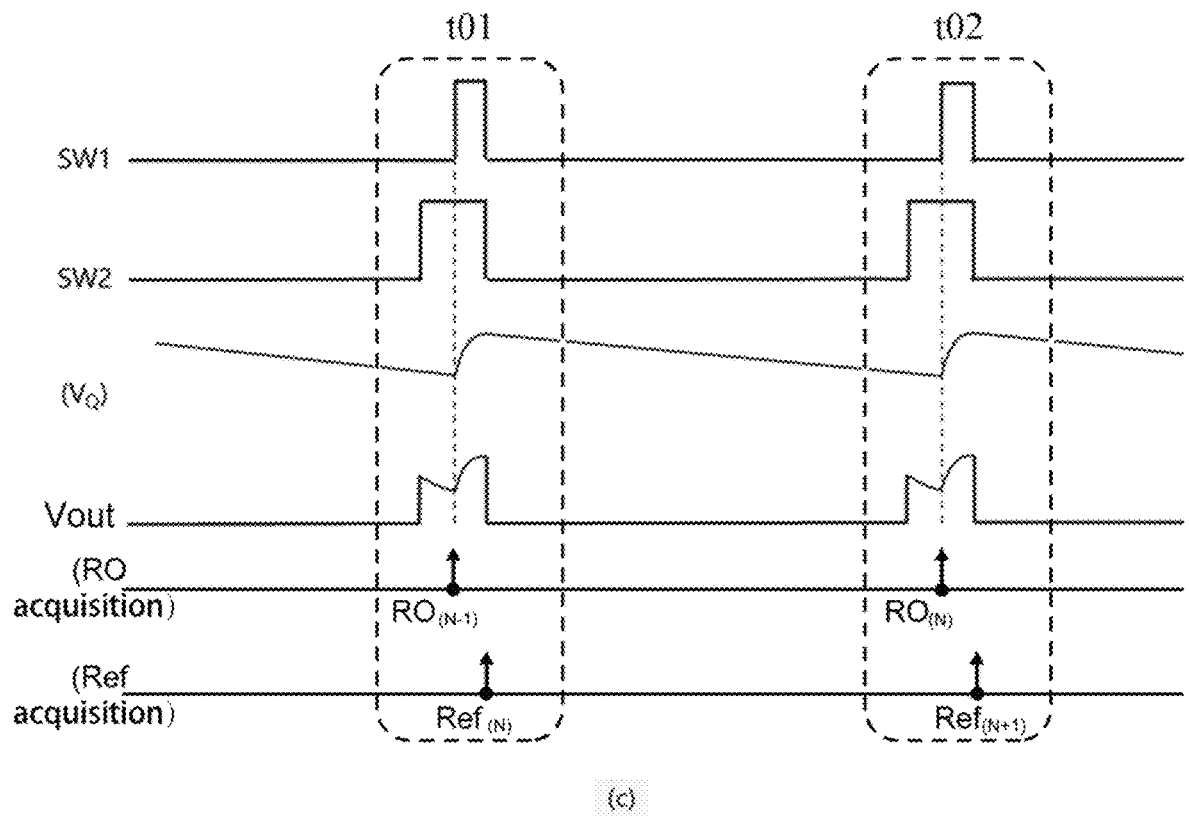
FIG. 5 is a second timing diagram of a detection period in a display panel according to some embodiments of the present disclosure.

As shown in FIG. 5, two adjacent detection periods are consecutive in time.

Specifically, the duration of the high level signal input from the fifth level terminal SW2 is longer than the duration of the high level signal input from the second level terminal SW1, provided that it needs to satisfy the requirement that the potential of the third node P tends to be stable after reset within the time width of the high level signal input from the second level terminal SW1. That is, when the first detection signal Ref is read, both the second level terminal SW1 and the fifth level terminal SW2 input the high level signal, so that both the first transistor T1 and the third transistor T3 are turned on. The fifth level terminal SW2 is allowed to input the low level signal after a period of time at the input of the low level signal from the second level terminal SW1. That is, the third transistor T3 is allowed to be turned off after the first transistor T1 is turned off for a period of time.

The driving module 30 acquires the first detection signal Ref and the second detection signal RO that are in the same detection period, with the time interval of the preset exposure time.

The first detection phase t01 includes a first sub-detection phase and a second sub-detection phase.

In the first sub-detection phase, the second level signal input from the second level terminal SW1 is a low level signal, and the first transistor T1 is turned off. The fifth level signal input from the fifth level terminal SW2 is a high level signal, and the third transistor T3 is turned on. The second transistor T2 is turned on under the control of the potential $V_Q$ of the first node Q, and the degree of opening of the second transistor T2 is determined by the magnitude of the potential $V_Q$ of the first node Q. The driving module 30 acquires the potential of the third node P when the second level signal input from the second level terminal SW1 is converted from the low level to the high level. At this time, the potential of the third node P is the potential of the second detection signal $RO_{(N-1)}$ in the previous detection period.

In the second sub-detection phase, both the second level signal input from the second level terminal SW1 and the fifth level signal input from the fifth level terminal SW2 are high level signals, and the first transistor T1 and the third transistor T3 are turned on. The third level signal supplied from the third level terminal V1 resets the potential $V_Q$ of the first node Q through the first transistor T1, so that the potential $V_Q$ of the first node Q gradually rises and tends to be stable, and the potential $V_Q$ of the first node Q is close to the potential of the third level signal. The second transistor T2 is turned on under the control of the potential $V_Q$ of the first node Q. The fourth level signal input from the fourth level terminal V2 is transmitted to the third node P through the second transistor T2 and the third transistor T3, and the potential of the third node P gradually rises and tends to be stable. The potential of the third node P is acquired after the potential of the third node P is stable and before the second level signal input from the second level terminal SW1 and the fifth level signal input from the fifth level terminal SW2 are converted from the high level to the low level. At this time, the potential of the third node P is the potential of the first detection signal $Ref_{(N)}$ in the current detection period acquired by the driving module 30. Specifically, the driving module 30 may acquire the potential of the third node P at any time when the second level signal input from the second level terminal SW1 and the fifth level signal input from the fifth level terminal SW2 are both high levels, provided that the acquisition time in each detection period is the same.

Similarly, the second detection phase t02 comprises a third sub-detection phase and a fourth sub-detection phase.

In the third sub-detection phase, the second level signal input from the second level terminal SW1 is a low level signal, and the first transistor T1 is turned off. The fifth level signal input from the fifth level terminal SW2 is a high level signal, and the third transistor T3 is turned on. The second transistor T2 is turned on under the control of the potential $V_Q$ of the first node Q, and the degree of opening of the second transistor T2 is determined by the magnitude of the potential $V_Q$ of the first node Q. The driving module 30 acquires the potential of the third node P when the second level signal input from the second level terminal SW1 is converted from the low level to the high level. At this time, the potential of the third node P is the potential of the second detection signal $RO_{(N)}$ in the current detection period.

In the fourth sub-detection phase, both the second level signal input from the second level terminal SW1 and the fifth level signal input from the fifth level terminal SW2 are high level signals, and the first transistor T1 and the third transistor T3 are turned on. The third level signal supplied from the third level terminal V1 resets the potential $V_Q$ of the first node Q through the first transistor T1, so that the potential $V_Q$ of the first node Q gradually rises and tends to be stable, and the potential $V_Q$ of the first node Q is close to the potential of the third level signal. The second transistor T2 is turned on under the control of the potential $V_Q$ of the first node Q, and the fourth level signal input from the fourth level terminal V2 is transmitted to the third node P through the second transistor T2 and the third transistor T3. At this time, the potential of the third node P is the potential of the first detection signal $Ref_{(N+1)}$ in the next detection period acquired by the driving module 30, and the potential of the third node P gradually rises and tends to be stable. The potential of the third node P is acquired after the potential of the third node P is stable and before the second level signal input from the second level terminal SW1 and the fifth level signal input from the fifth level terminal SW2 are converted from the high level to the low level. Specifically, the driving module 30 may acquire the potential of the third node P at any time when the second level signal input from the second level terminal SW1 and the fifth level signal input from the fifth level terminal SW2 are both high levels, provided that the acquisition time in each detection period is the same, in which N is a positive integer.

The driving module 30 acquires, in the first detection phase t01, the second detection signal RO in the previous detection period and the first detection signal Ref in the current detection period, and acquires, in the second detection phase t02, the second detection signal RO in the current detection period and the first detection signal Ref in the next detection period, so that two adjacent detection periods are consecutive in time.

It is to be met that, firstly, when the first detection signal Ref is read, the potential of the third node P tends to be stable. That is, the time for the second level terminal SW1 to input the high level signal is sufficient, and the time node to read the first detection signal Ref is set to a reasonable degree. Secondly, the time node to read the second detection signal RO needs to avoid the rising edges of the fifth level signal and the second level signal, and thus can be set at any appropriate time after the fifth level signal is converted to the high level signal and before the second level signal is converted to the high level signal, so as to avoid the coupling effect at the moment when the switch is opened and avoid influence on the accuracy of the detection.

Figure 6:
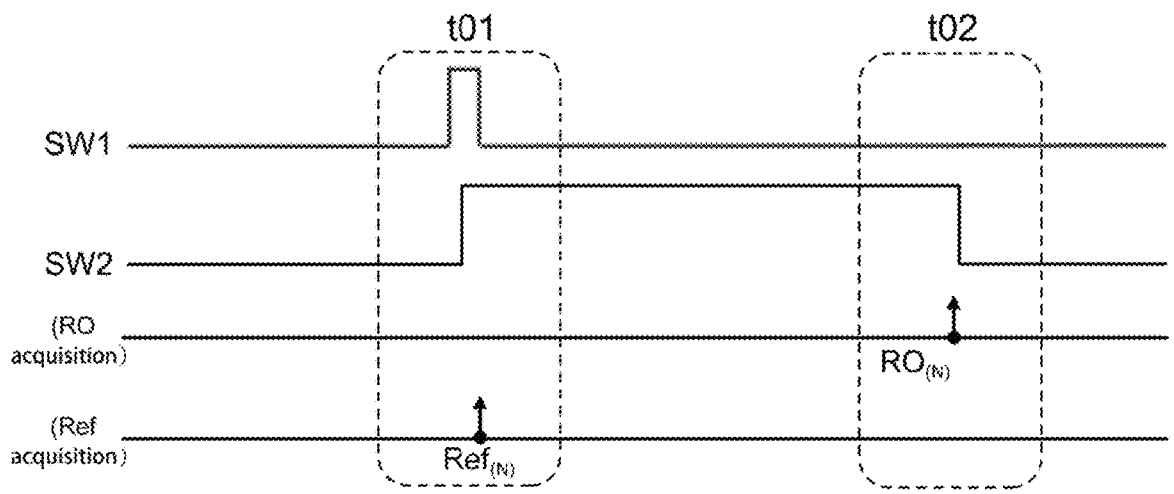
FIG. 6 is a third timing diagram of a detection period in a display panel according to some embodiments of the present disclosure.

As shown in FIG. 6, the detection period of the display panel 100 includes a first detection phase t01 and a second detection phase t02. Specifically, the driving module 30 acquires the first detection signal Ref and the second detection signal RO that are in the same detection period, with the time interval of the preset exposure time.

In the first detection phase t01, both the second level signal input from the second level terminal SW1 and the fifth level signal input from the fifth level terminal SW2 are high level signals, and the first transistor T1 and the third transistor T3 are turned on. The third level signal supplied from the third level terminal V1 resets the potential $V_Q$ of the first node Q through the first transistor T1, so that the potential $V_Q$ of the first node Q gradually rises and tends to be stable, and the potential $V_Q$ of the first node Q is close to the potential of the third level signal. Here, the driving module 30 acquires the potential of the third node P when the second level signal input from the second level terminal SW1 is converted from the high level to the low level. At this time, the potential of the third node P is the potential of the first detection signal Ref acquired by the driving module 30. Specifically, the driving module 30 may acquire the potential of the third node P at any time when the second level signal input from the second level terminal SW1 is high level, provided that acquisition time in each detection period may be the same.

In the second detection phase t02, the second level signal input from the second level terminal SW1 is a low level signal, and the first transistor T1 is turned off. The fifth level signal input from the fifth level terminal SW2 is a high level signal, and the third transistor T3 is turned on. The second transistor T2 is turned on under the control of the potential $V_Q$ of the first node Q, and the degree of opening of the second transistor T2 is determined by the magnitude of the potential $V_Q$ of the first node Q. The potential of the third node P is acquired before the second level signal input from the second level terminal SW1 is converted from the low level to the high level. At this time, the potential of the third node P is the potential of the second detection signal RO acquired by the driving module 30. Specifically, the driving module 30 may acquire the potential of the third node P at any time when the fifth level signal input from the fifth level terminal SW2 is the high level, provided that the acquisition time in each detection period may be the same.

By comparing the potential of the third node P acquired in the second detection phase t02 with that acquired in the first detection phase t01, the brightness change of light in the environment in which the display panel 100 is located can be determined from the potential difference value, and thus the driving signal supplied to the pixel array 10 can be adjusted according to the brightness of light in the environment in which the display panel 100 is located. Further, a relationship between the potential of the third node P and the brightness of the ambient light may be established, so that the brightness of light in the environment in which the display panel 100 is located may be determined based on the potential of the third node P.

Figure 7:
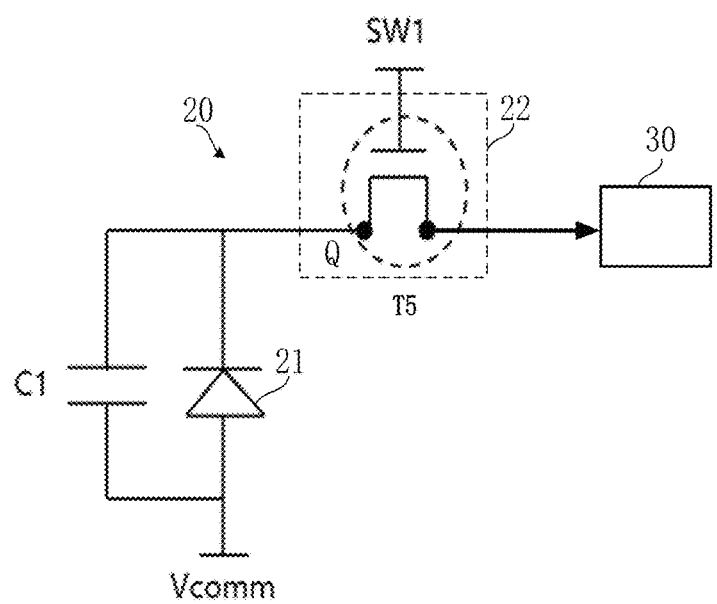
FIG. 7 is a circuit diagram of a second structure of a detection module of the display panel provided in FIG. 1.

As shown in FIG. 7, the signal generation unit 22 includes a fifth transistor. A first electrode of the fifth transistor is electrically connected to the first node Q, a gate of the fifth transistor is electrically connected to the second level terminal SW1, and a second electrode of the fifth transistor is electrically connected to the driving module 30.

Figure 8:
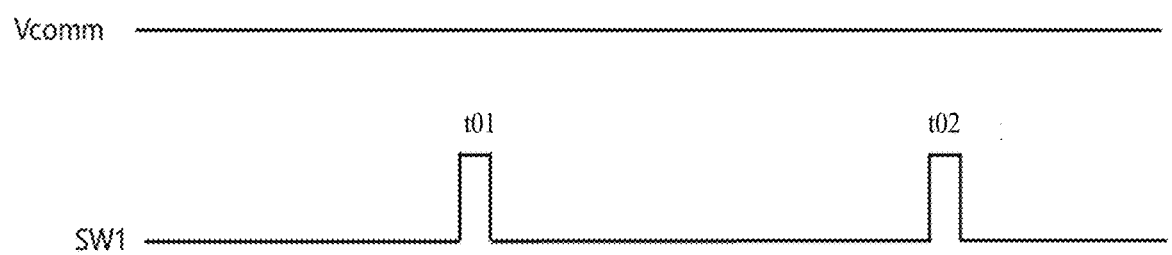
FIG. 8 is a fourth timing diagram of a detection period in a display panel according to some embodiments of the present disclosure.

As shown in FIG. 8, the detection period of the display panel 100 includes a first detection phase t01 and a second detection phase t02. In the first detection phase t01, the second level signal input from the second level terminal SW1 is a high level signal, and the first transistor T1 is turned on. The driving module 30 resets the first node Q to a potential of the first detection signal Ref. Specifically, the driving module 30 may acquire the potential of the first node Q at any time when the second level signal input from the second level terminal SW1 is the high level, provided that the acquisition time node in each detection period is the same.

After a period of exposure, the potential of the first node Q is again acquired at the second detection phase t02.

In the second detection phase t02, the second level signal input from the second level terminal SW1 is converted from the low level to the high level, and the first transistor T1 is turned on. The potential of the first node Q is acquired before the second level signal input from the second level terminal SW1 is converted from the high level to the low level. At this time, the potential of the first node Q is the potential of the second detection signal RO acquired by the driving module 30. Specifically, the driving module 30 may acquire the potential of the first node Q at any time when the second level signal input from the second level terminal SW1 is the high level, provided that the acquisition time in each detection period is the same.

By comparing the potential of the first node Q acquired in the second detection phase t02 with that acquired in the first detection phase t01, the brightness change of light in the environment in which the display panel 100 is located can be determined from the potential difference value, and thus the driving signal supplied to the pixel array 10 can be adjusted according to the brightness of light in the environment in which the display panel 100 is located. Further, a correspondence relationship between the potential of the first node Q and the brightness of the ambient light may be established, so that the brightness of light in the environment in which the display panel 100 is located may be determined based on the potential of the first node Q.

In some embodiments of the present disclosure, a frame of display picture (F1, F2 . . . , or Fn) includes a plurality of display periods t001 and a blank period t002. The blank period t002 is provided between two display periods t001 corresponding to two adjacent frames of display pictures respectively. The first detection phase t01 and the second detection phase t02 are provided at the blank periods t002 corresponding to two frames of display pictures respectively. Further, a frame of display picture (F1, F2 . . . , or Fn) further includes a plurality of touch periods t003. At a time corresponding to the touch periods t003, the detection module 20 outputs the touch signal, and the driving module 30 supplies the driving signal to the pixel array 10 according to the touch signal. In the frame of display picture (F1, F2 . . . , or Fn), the plurality of touch signal detection periods are alternated with the plurality of display periods t001.

Figure 9:
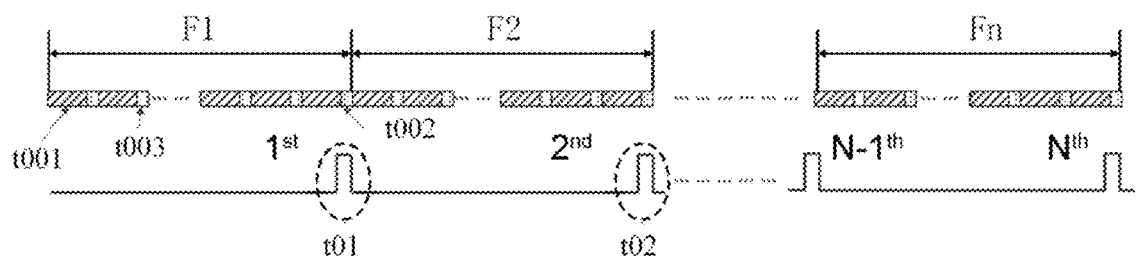
FIG. 9 is a fifth timing diagram of a detection period in a display panel according to some embodiments of the present disclosure.

As shown in FIG. 9, a frame of display picture (F1, F2 . . . , or Fn) includes a plurality of display periods t001 and a blank period t002. The blank period t002 is provided between two display periods t001 corresponding to two adjacent frames of display pictures respectively. The first detection phase t01 and the second detection phase t02 are provided at the blank periods t002 corresponding to two adjacent frames of display pictures respectively. That is, the driving module 30 may acquire the first detection signal Ref and the second detection signal RO that are in the same detection period with a time interval of the frame of display picture (F1, F2 . . . , or Fn). Further, the frame of display picture (F1, F2 . . . , or Fn) further includes a plurality of touch periods t003, and at the time corresponding to the touch periods t003, the detection module 20 outputs a touch signal, and the driving module 30 supplies the driving signal to the pixel array 10 according to the touch signal. In the frame of display picture (F1, F2 . . . , or Fn), the plurality of touch signal detection periods are alternated with the plurality of display periods t001.

Figure 10:
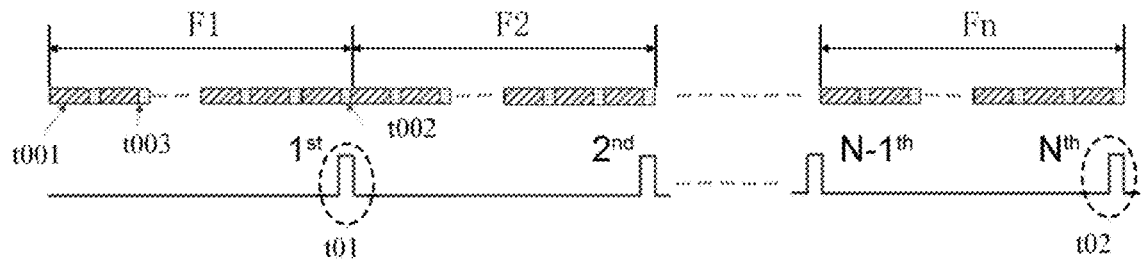
FIG. 10 is a sixth timing diagram of a detection period in a display panel according to some embodiments of the present disclosure.

As shown in FIG. 10, a frame of display picture (F1, F2 . . . , or Fn) includes a plurality of display periods t001 and a blank period t002. The blank period t002 is provided between two display periods t001 corresponding to two adjacent frames of display pictures respectively. The first detection phase t01 and the second detection phase t02 are provided at the blank periods t002 corresponding on two spaced frames of display pictures respectively. Specifically, the first detection phase t01 and the second detection phase t02 may be separated by one frame of display picture (F1, F2 . . . , or Fn), two frames of display pictures, three frames of display pictures . . . , or N frames of display pictures (N is a positive integer). That is, the driving module 30 acquires the first detection signal Ref and the second detection signal RO that are in the same detection period with a time interval of N frames of display pictures. Further, the frame of display picture (F1, F2 . . . , or Fn) further includes the plurality of touch periods t003. At the time corresponding to the touch period t003, the detection module 20 outputs the touch signal, and the driving module 30 supplies the driving signal to the pixel array 10 according to the touch signal. In the frame of display picture (F1, F2 . . . , or Fn), the plurality of touch signal detection periods are alternated with the plurality of display periods t001.

In some embodiments of the present disclosure, a frame of display picture (F1, F2 . . . , or Fn) includes display periods t001 and touch periods t003, and the display periods t001 are alternated with the touch periods t003. The first detection phase t01 and the second detection phase t02 are provided at two touch periods t003 in one frame of display picture (F1, F2 . . . , or Fn), and/or, the first detection phase t01 and the second detection phase t02 are provided at touch periods t003 respectively corresponding to two frames of display picture.

Figure 11:
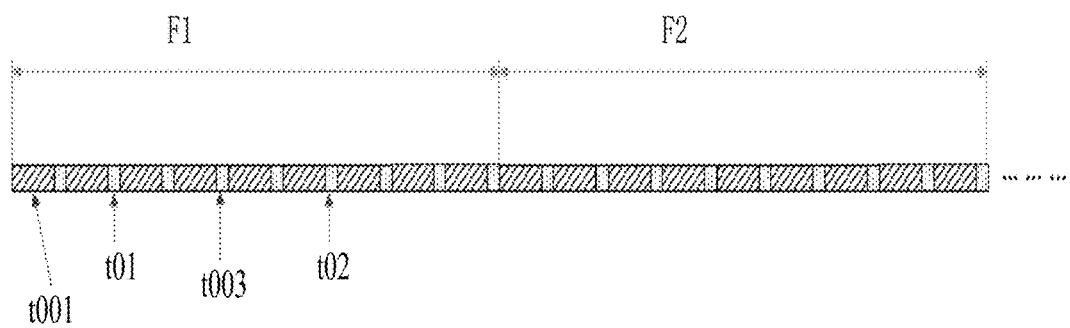
FIG. 11 is a seventh timing diagram of a detection period in a display panel according to some embodiments of the present disclosure.
Figure 12:
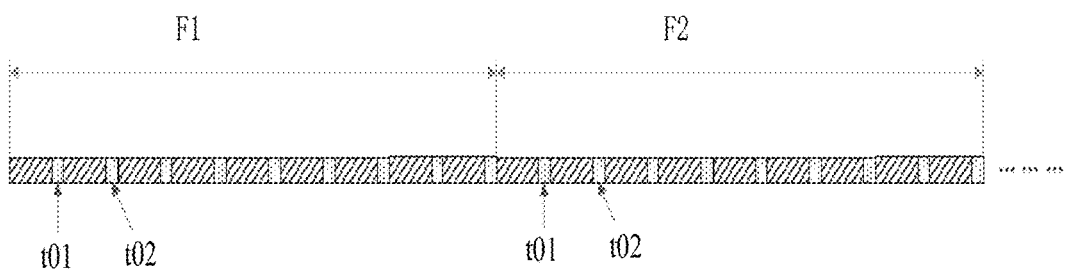
FIG. 12 is an eighth timing diagram of a detection period in a display panel according to some embodiments of the present disclosure.
Figure 13:
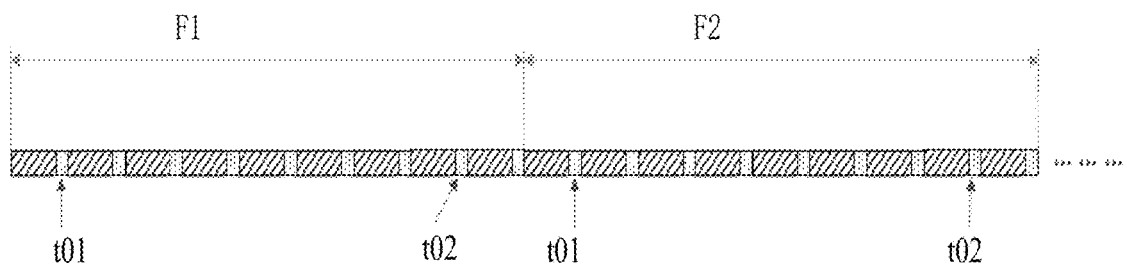
FIG. 13 is a ninth timing diagram of a detection period in a display panel according to some embodiments of the present disclosure.

As shown in FIGS. 11 to 13, a frame of display picture (F1, F2 . . . , or Fn) includes a plurality of display periods t001, a plurality of touch periods t003, and a blank period t002. The display periods t001 are alternated with the touch periods t003, and the blank period t002 is provided between two display periods t001 corresponding to two adjacent frames of display pictures respectively. The first detection phase t01 and the second detection phase t02 are provided at two touch periods t003 in one frame of display picture (F1, F2 . . . , or Fn). Such an arrangement allows the preset exposure time between the acquisition of the first detection signal Ref and the acquisition of the second detection signal RO in the same detection period by the driving module 30 can be adjusted in a wide range, without affecting the duration of the display period t001.

Specifically, the preset exposure time between the acquisition of the first detection signal Ref and the acquisition of the second detection signal RO in the same detection period by the driving module 30 can be one display period t001 or more than one display time period t001. Two adjacent detection periods correspond to the same detection time in two frames of display pictures. For example, the driver module 30 acquires, in the previous detection period, the first detection signal Ref at the n-th touch period t003 and a second detection signal RO in the m-th touch period t003 in a frame of display picture (F1, F2 . . . , or Fn), and then the driver module 30 acquires, in the adjacent detection period, the first detection signal Ref at the n-th touch period t003 and the second detection signal RO at the m-th touch period t003 in the corresponding frame of display picture, in which both n and m are positive integers. The detection times of the two adjacent detection periods in the two frames of display picture may also be different.

Figure 14:
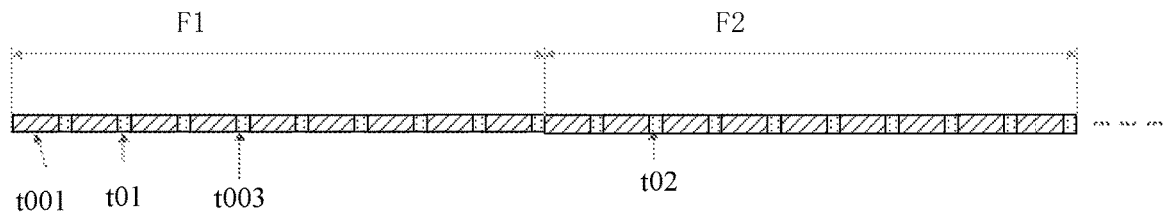
FIG. 14 is a tenth timing diagram of a detection period in a display panel according to some embodiments of the present disclosure.

As shown in FIG. 14, the first detection phase t01 and the second detection phase t02 are provided at the touch periods t003 in two frames of display pictures, respectively. The first detection phase t01 and the second detection phase t02 correspond to the same detection time in two frames of display pictures. For example, the driving module 30 acquires the first detection signal Ref at the n-th touch period t003 in one (e.g., F1) of two frames of display pictures, and acquires the second detection signal RO at the n-th touch period t003 in the other one (e.g., F2) of the two frames of display pictures, with n being a positive integer. The detection time corresponding to the first detection phase t01 and the second detection phase t02 in the two frames of display pictures may also be different.

Figure 15:
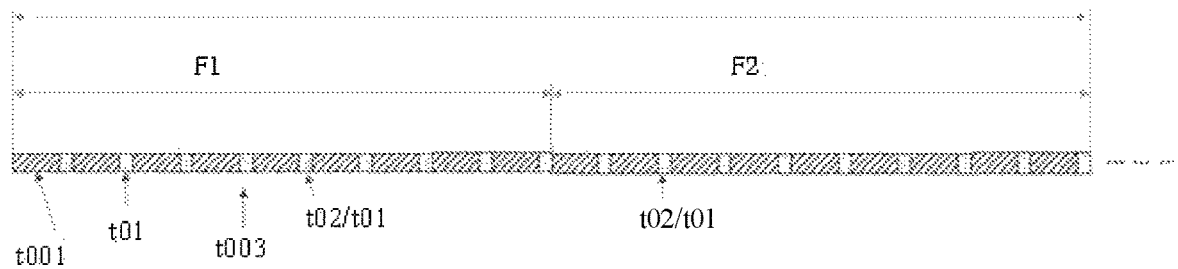
FIG. 15 is a eleventh timing diagram of a detection period in a display panel according to some embodiments of the present disclosure.

As shown in FIG. 15, adjacent two detection periods are consecutive in time. The driving module 30 acquires, at any one of the touch periods t003 in one (e.g., F1) of two frames of display pictures, the second detection signal $RO_{(N-1)}$ in the previous detection period and the first detection signal $Ref_{(N)}$ in the current detection period, and acquires, at any one of the touch periods t003 in the other (e.g., F2) of the two frames of display pictures, the second detection signal $RO_{(N)}$ in the current detection period and the first detection signal $Ref_{(N+1)}$ in the next detection period. The two frames of display pictures may be adjacent or spaced apart from each other. Continuous acquisition of the corresponding detection signals for a plurality of times can improve the accuracy of the detection signals.

According to the present disclosure, there is provided a display panel having a display area and a non-display area disposed around the display area. The display panel includes a pixel array, a driving module, a driving signal line, a detection module, and a detection signal line. The pixel array is disposed in the display area. The driving module is provided in the non-display area, and is configured to output a driving signal to the pixel array. A first end of the driving signal line is connected to the driving module, and a second end of the driving signal line is connected to the pixel array. The detection module is provided in the non-display area, and is configured to output a detection signal to the driving module. A first end of the detection signal line is connected to the driving module, and a second end of the detection signal line is connected to the detection module. The detection signal line is provided on a side of the driving signal line away from the display area, and an orthographic projection of the detection signal line in a thickness direction of the display panel has no overlap with an orthographic projection of the driving signal line in the thickness direction of the display panel. The driving module is configured to supply the driving signal to the pixel array according to the detection signal. The driving module in the display panel is assembled on the display panel by a binding process and other processes, and the driving module provides a driving signal to the pixel array according to a detection signal output from the detection module, so that the display panel can realize an optical signal detection function without an additional photosensitive driving chip, thereby reducing the cost and the space occupied by the driving circuit.

Figure 16:
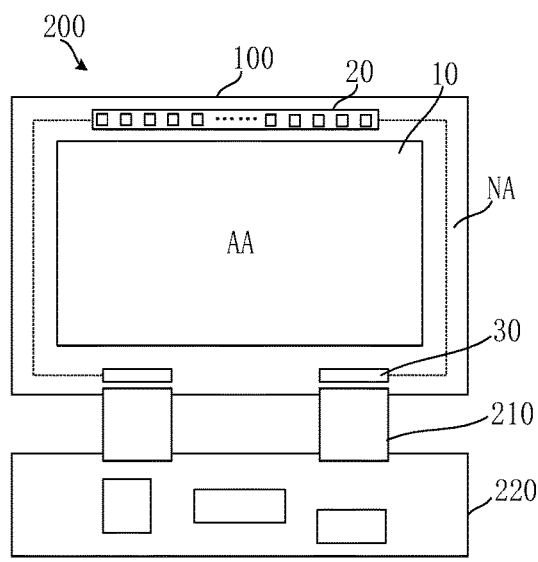
FIG. 16 is a schematic diagram of a display device according to some embodiments of the present disclosure.

As shown in FIG. 16, the present disclosure further provides a display device 200 including the display panel 100 described above, a flexible circuit board 210 and a printed circuit board 220. The flexible circuit board is electrically connected to the driving module 30 of the display panel 100 and the printed circuit board. The printed circuit board includes a timing controller, a power management integrated circuit, a virtual server, and other components.

The above detailed description of the display panel according to the embodiments of the present disclosure is provided. The foregoing description of the embodiments of the present disclosure is merely intended to assist in understanding the core idea of the present disclosure, and should not be construed as limiting the scope of the present disclosure.

The transistor used in the embodiments of the present disclosure is an N-type transistor. The N-type transistor is turned on when the gate is at a high potential and turned off when the gate is at a low potential. Specifically, the embodiments of the present disclosure may also employ a P-type transistor. The P-type transistor is turned on when the gate is at a low potential and turned off when the gate is at a low potential. That is, different types of transistors have different on and off levels.

What is claimed is:

1. A display panel having a display area and a non-display area disposed around the display area, wherein the display panel comprises:
   a pixel array disposed in the display area;
   a driving module disposed in the non-display area and configured to output a driving signal to the pixel array;
   a driving signal line, a first end of the driving signal line being connected to the driving module, and a second end of the driving signal line being connected to the pixel array;
   a detection module disposed in the non-display area and configured to output a detection signal to the driving module; and
   a detection signal line, a first end of the detection signal line being connected to the driving module, and a second end of the detection signal line being connected to the detection module;
   wherein the detection signal line is disposed on a side of the driving signal line away from the display area, an orthographic projection of the detection signal line in a thickness direction of the display panel has no overlap with an orthographic projection of the driving signal line in the thickness direction of the display panel, and the driving module is configured to provide the driving signal to the pixel array according to the detection signal, and
   the detection module comprises a detection sensor and a signal generation unit, the signal generation unit is electrically connected to the driving module, the signal generation unit comprises a first node, the detection sensor and the signal generation unit are electrically connected to the first node, the detection sensor is configured to acquire brightness information of an environment in which the display panel is located and to control a potential of the first node according to the brightness information, and the signal generation unit is configured to generate a detection signal according to the potential of the first node.

2. The display panel according to claim 1, wherein at least one frame of display picture comprises a plurality of display periods, a plurality of touch periods, and one or more detection periods, and one of the touch periods or one of the detection periods is disposed between two adjacent display periods.

3. The display panel according to claim 2, wherein the detection periods comprise a first detection phase and a second detection phase, the signal generation unit is configured to output a first detection signal at the first detection phase, and to output a second detection signal at the second detection phase, and the driving module is configured to supply the driving signal to the pixel array according to a potential difference between the first detection signal and the second detection signal.

4. The display panel according to claim 3, wherein two adjacent detection periods are consecutive in time.

5. The display panel according to claim 3, wherein at least one frame of display picture further comprises a blank period, and the blank period is provided between two display periods respectively corresponding to two adjacent frames of display pictures; and
   the first detection phase and the second detection phase is provided in the blank period between two frames of display pictures.

6. The display panel according to claim 3, wherein the first detection phase and the second detection phase are respectively provided in two of the touch periods in one frame of display picture; and/or,
   the first detection phase and the second detection phase are respectively provided in the touch periods corresponding to two frames of display pictures.

7. The display panel according to claim 1, wherein the display panel comprises a first level terminal, the detection sensor comprises a photosensitive diode, an anode of the photosensitive diode is electrically connected to the first level terminal, and a cathode of the photosensitive diode is electrically connected to the first node.

8. The display panel according to claim 7, wherein the detection module further comprises a capacitor, a first plate of the capacitor is electrically connected to the anode of the photosensitive diode, and a second plate of the capacitor is electrically connected to the cathode of the photosensitive diode.

9. The display panel according to claim 8, wherein the display panel further comprises a second level terminal, a third level terminal, a fourth level terminal, a fifth level terminal, and a sixth level terminal, and the signal generation unit comprises a first transistor, a second transistor, a third transistor, a fourth transistor, a second node, and a third node,
   a gate of the first transistor is electrically connected to the second level terminal, a first electrode of the first transistor is electrically connected to the third level terminal, and a second electrode of the first transistor is electrically connected to the first node;
   a gate of the second transistor is electrically connected to the first node, a first electrode of the second transistor is electrically connected to the fourth level terminal, and a second electrode of the second transistor and a first electrode of the third transistor are electrically connected to the second node;
   a gate of the third transistor is electrically connected to the fifth level terminal, and a second electrode of the third transistor and a first electrode of the fourth transistor are electrically connected to the third node;
   a gate of the fourth transistor is electrically connected to the sixth level terminal, and a second electrode of the fourth transistor is electrically connected to a ground terminal; and
   the driving module is electrically connected to the third node.

10. The display panel according to claim 9, wherein the signal generation unit further comprises a fifth transistor, a first electrode of the fifth transistor is electrically connected to the first node, a gate of the fifth transistor is electrically connected to the second level terminal, and a second electrode of the fifth transistor is electrically connected to the driving module.

11. The display panel according to claim 1, wherein the display panel further comprises a plurality of touch detection modules, each of the touch detection modules comprises a touch line and a touch detection unit, the touch line is electrically connected to the touch detection unit, and the driving module is electrically connected to the touch line to drive the touch detection unit and receive a touch detection signal.

12. A display device comprising a display panel, a flexible circuit board, and a printed circuit board, the flexible circuit board being electrically connected to the display panel and the printed circuit board,
wherein the display panel has a display area and a non-display area disposed around the display area, and the display panel comprises:
a pixel array disposed in the display area;
a driving module disposed in the non-display area and configured to output a driving signal to the pixel array;
a driving signal line, a first end of the driving signal line being connected to the driving module, and a second end of the driving signal line being connected to the pixel array;
a detection module disposed in the non-display area and configured to output a detection signal to the driving module; and
a detection signal line, a first end of the detection signal line being connected to the driving module, and a second end of the detection signal line being connected to the detection module;
wherein the detection signal line is disposed on a side of the driving signal line away from the display area, an orthographic projection of the detection signal line in a thickness direction of the display panel has no overlap with an orthographic projection of the driving signal line in the thickness direction of the display panel, and the driving module is configured to provide the driving signal to the pixel array according to the detection signal, and
the detection module comprises a detection sensor and a signal generation unit, the signal generation unit is electrically connected to the driving module, the signal generation unit comprises a first node, the detection sensor and the signal generation unit are electrically connected to the first node, the detection sensor is configured to acquire brightness information of an environment in which the display panel is located and to control a potential of the first node according to the brightness information, and the signal generation unit is configured to generate a detection signal according to the potential of the first node.

13. The display device according to claim 12, wherein the printed circuit board comprises a timing controller and a power management integrated circuit.

14. The display device according to claim 12, wherein the display panel comprises a first level terminal, the detection sensor comprises a photosensitive diode, an anode of the photosensitive diode is electrically connected to the first level terminal, and a cathode of the photosensitive diode is electrically connected to the first node.

15. The display device according to claim 14, wherein the detection module further comprises a capacitor, a first plate of the capacitor is electrically connected to the anode of the photosensitive diode, and a second plate of the capacitor is electrically connected to the cathode of the photosensitive diode.

16. The display device according to claim 15, wherein the display panel further comprises a second level terminal, a third level terminal, a fourth level terminal, a fifth level terminal, and a sixth level terminal, and the signal generation unit comprises a first transistor, a second transistor, a third transistor, a fourth transistor, a second node, and a third node,
a gate of the first transistor is electrically connected to the second level terminal, a first electrode of the first transistor is electrically connected to the third level terminal, and a second electrode of the first transistor is electrically connected to the first node;
a gate of the second transistor is electrically connected to the first node, a first electrode of the second transistor is electrically connected to the fourth level terminal, and a second electrode of the second transistor and a first electrode of the third transistor are electrically connected to the second node;
a gate of the third transistor is electrically connected to the fifth level terminal, and a second electrode of the third transistor and a first electrode of the fourth transistor are electrically connected to the third node;
a gate of the fourth transistor is electrically connected to the sixth level terminal, and a second electrode of the fourth transistor is electrically connected to a ground terminal; and
the driving module is electrically connected to the third node.

17. The display device according to claim 16, wherein the signal generation unit comprises a fifth transistor, a first electrode of the fifth transistor is electrically connected to the first node, a gate of the fifth transistor is electrically connected to the second level terminal, and a second electrode of the fifth transistor is electrically connected to the driving module.

18. The display device according to claim 12, wherein the display panel further comprises a plurality of touch detection modules, each of the touch detection modules comprises a touch line and a touch detection unit, the touch line is electrically connected to the touch detection unit, and the driving module is electrically connected to the touch line to drive the touch detection unit and receive a touch detection signal.

* * * * *